(12) United States Patent
Tourunen et al.

(10) Patent No.: US 7,167,475 B2
(45) Date of Patent: Jan. 23, 2007

(54) DATA PACKET NUMBERING IN PACKET-SWITCHED DATA TRANSMISSION

(75) Inventors: Ari Tourunen, Espoo (FI); Juha Kalliokulju, Vesilahati (FI); Jan Suumäki, Tampere (FI); Hans Kallio, Tampere (FI)

(73) Assignee: Nokia Corporation, Espoo (FI)

( * ) Notice: Subject to any disclaimer, the term of this patent is extended or adjusted under 35 U.S.C. 154(b) by 991 days.

(21) Appl. No.: 09/780,529

(22) Filed: Feb. 9, 2001

(65) Prior Publication Data

US 2001/0030965 A1 Oct. 18, 2001

(30) Foreign Application Priority Data

Feb. 14, 2000 (FI) .............................. 20000315

(51) Int. Cl.
*H04L 12/28* (2006.01)

(52) U.S. Cl. ................. 370/394; 370/466; 370/474; 370/328; 370/338

(58) Field of Classification Search ............. 370/394, 370/465, 466, 473, 474, 328, 338, 401
See application file for complete search history.

(56) References Cited

U.S. PATENT DOCUMENTS

| | | | | |
|---|---|---|---|---|
| 5,168,497 | A | * 12/1992 | Ozaki et al. ............... | 370/394 |
| 5,245,616 | A | * 9/1993 | Olson ........................ | 714/748 |
| 5,444,718 | A | * 8/1995 | Ejzak et al. ................ | 714/748 |
| 5,987,137 | A | 11/1999 | Karppanen et al. .......... | 380/28 |
| 6,335,933 | B1 * | 1/2002 | Mallory ..................... | 370/394 |
| 6,389,016 | B1 * | 5/2002 | Sabaa et al. ................ | 370/389 |
| 6,487,689 | B1 * | 11/2002 | Chuah ........................ | 714/748 |
| 6,519,223 | B1 * | 2/2003 | Wager et al. ............... | 370/216 |
| 6,577,813 | B1 * | 6/2003 | Ibaraki et al. .............. | 386/111 |
| 6,590,905 | B1 * | 7/2003 | Suumaki et al. ........... | 370/466 |
| 6,621,796 | B1 * | 9/2003 | Miklos ....................... | 370/236 |
| 6,697,331 | B1 * | 2/2004 | Riihinen et al. ............ | 370/236 |
| 7,009,951 | B2 * | 3/2006 | Kalliokulju et al. ........ | 370/331 |

FOREIGN PATENT DOCUMENTS

| | | |
|---|---|---|
| EP | 0726685 A3 | 8/1996 |
| EP | 0866579 A1 | 9/1998 |
| WO | WO 99/09698 | 2/1999 |
| WO | WO 99/17488 | 4/1999 |

OTHER PUBLICATIONS

Tourunen et al., "Data packet numbering in packet-switched data transmission," U.S. Appl. No. 09/779,979.*

"The GSM System for Mobile Communications", Mouly et al., France, 1992, pp. 699.

(Continued)

*Primary Examiner*—Huy D. Vu
*Assistant Examiner*—Nittaya Juntima
(74) *Attorney, Agent, or Firm*—Perman & Green, LLP

(57) ABSTRACT

A data packet transmission method in a packet-switched telecommunication system. A telecommunication protocol comprises a convergence protocol layer for adapting user data packets to convergence protocol packets and a link layer for transmitting the convergence protocol packets as data units and for acknowledging the transmission. A data packet number is defined for the convergence protocol packets to be transmitted. The convergence protocol packets are transferred to the link layer to be transmitted. A data packet number is defined for the received convergence protocol packets and the received convergence protocol packets are acknowledged to the transmitter. The identification data of any convergence protocol packets lost on the link layer are transmitted to the recipient. The counter value of the recipient is updated to correspond to the counter value of the transmitter, to take into account the lost convergence protocol packets.

34 Claims, 6 Drawing Sheets

OTHER PUBLICATIONS

"3$^{rd}$ Generation Partnership Project; Technical Specification Group Radio Access Network; Packet Data Convergence Protocol (PDCP) Specification (3G TS 25.323 version 3.0.0)", 1999.

"3$^{rd}$ Generation Partnership Project; Technical Specification Group Radio Access Network; RLC Protocol Specification (3G TS 25.322 version 3.1.2)", 2000.

* cited by examiner

DATA PACKET NUMBERING IN PACKET-SWITCHED DATA TRANSMISSION

BACKGROUND OF THE INVENTION

1. Field of the Invention

The invention relates to a packet-switched data transmission and more precisely to optimization of data packet numbering, particularly in connection with an acknowledged transmission.

2. Brief Description of Related Developments

In the development of so-called third generation mobile communication systems, for which at least the terms UMTS (Universal Mobile Telecommunication System) and IMT-2000 (International Mobile Telephone System) are used, one starting point has been that they would be so compatible as possible with the second generation mobile communication systems, such as the GSM system (Global System for Mobile Communications). The UMTS core network, for instance, is planned to be implemented on the basis of the GSM core network, and thus the already existing networks can be utilized as efficiently as possible. Further, one aim is to enable the third generation mobile stations to utilize a handover between the UMTS and the GSM. This applies to a packet-switched data transmission as well, particularly between the UMTS and the GPRS (General Packet Radio Service), which is planned to be used in the GSM.

In a packet-switched data transmission, a reliable, i.e. acknowledged, transmission or an unreliable, i.e. unacknowledged, transmission can be used. In the reliable data transmission, the recipient transmits an acknowledgement of the received data packets PDU (Protocol Data Unit) to the transmitter, and the transmitter can transmit the lost or the faulty data packets anew. In the GPRS system, data transmission reliability of the inter-SGSN (Serving GPRS Support Node) handover is secured by means of an 8-bit N-PDU number (Network PDU) associated with the data packets, which helps to check the data packets transmitted to the recipient. In the UMTS system according to the current specifications, reliability of the corresponding handover between serving nodes in a packet-switched data transmission is checked by a 12-bit RLC sequence number of an RLC layer (Radio Link Control) of the packet data protocol.

In a handover between the GPRS and the UMTS, the GPRS is responsible for the reliability of the handover, and so the reliability is arranged to be checked by means of the N-PDU numbers of the GPRS, on the basis of which identification numbers used in the UMTS are created in the handover process. In the handover from the UMTS to the GPRS, the UMTS is responsible for the handover, and the reliability check is based on the identification data of data packets contained in the UMTS. For this purpose, the UMTS system is planned to be provided with an 8-bit data packet number, which is combined as an additional byte with a data packet of the convergence protocol layer PDCP (Packet Data Convergence Protocol) belonging to the UMTS packet data protocol. This PDCP-PDU number thus forms a data packet number logically corresponding to the N-PDU number of the GPRS, and on the basis of this number it is checked in the handover that all data packets have been transferred reliably. It is also possible that the 8-bit PDCP-PDU number is formed of 12-bit RLC sequence numbers by deleting four most significant bits. A corresponding PDCP-PDU numbering, i.e. N-PDU numbering, can also be used in a handover between the UMTS radio network subsystems (so-called SRNS Relocation). Data packets PDU are placed to a buffer to wait until the responsibility for the connection has been transferred to the serving node SGSN of another system or in the intra-UMTS handover to a new serving radio network subsystem SRNS, and the transmitted data packets can be deleted from the buffer each time an acknowledgement of the received data packets is obtained from the recipient.

A problem in the above arrangement is to associate the header field of each data packet of the convergence protocol layer PDCP with the additional byte of the PDCP-PDU number. This increases load in the data transmission, since an additional byte is transmitted in each data packet. The UMTS packet data service does not, however, use the PDCP-PCU number for any purpose in the normal data transmission, but it is only utilized in the handover between the UMTS and the GPRS and in the intra-UMTS handover.

Another problem in the above arrangement is the creation of PDCP-PDU numbers from RLC sequence numbers. RLC numbers are defined sequentially for data units RLC-PDU of the RLC layer. Due to a delay in the system, the buffer may contain a large number of data units RLC-PDU. If the RLC sequence numbers exceed 255, which is the biggest decimal number that can be expressed with eight bits, two or more data packets may have the same PDCP-PDU number, as four most significant bits are deleted from the 12 bits of the RLC sequence numbers. Thus, the recipient can no longer define the data packet to be acknowledged unambiguously on the basis of the PDCP-PDU number of the received data packet, and the reliability of the handover cannot be checked any more.

A further problem may arise in a potential multiplexing of packet data transmissions in the PDCP layer, whereby the RLC layer below the PDCP layer receives data packets from several connections simultaneously. Since the handover reliability is secured on the basis of the bearer connection, defining RLC sequence numbers for many simultaneous connections is very difficult and, in regard to the reliability of the handover, insecure.

SUMMARY OF THE INVENTION

The invention provides an improved method and an apparatus implementing the method to avoid the above stated problems.

The invention is based on the idea that a "virtual" data packet numbering maintained by counters is used for numbering data packets on the PDCP layer. Both a transmitting PDCP and a receiving PDCP monitor data packets transferred by means of the counters, and the receiving PDCP acknowledges the received data packets by means of a counter reading, preferably in a manner corresponding to a normal, acknowledged data transmission, whereby data packet numbers need not be transmitted at all with the data packets.

An additional problem is caused by the use of the above "virtual" data packet numbering in poor transmission conditions and particularly in a handover between the UMTS and the GPRS and in an intra-UMTS handover, in which reliable data transmission cannot be guaranteed, whereby data packets disappear during transmission and in addition, the current data packet discarding mechanism does not inform the recipient of how many data packets have been discarded at one time. Consequently, the data packet counters of the transmitter and the recipient do not synchronize with one another and they cannot be synchronized either, as the recipient is not aware of the number of the discarded data packets.

This additional problem is solved by indicating the discarded data packets to the recipient such that the recipient can synchronize the value of its data packet counter to correspond to the value of the transmitter's data packet counter.

The method and system of the invention provide the advantage that in optimal transmissions, reliable data transmission can be guaranteed without having to transmit data packet numbers at all, which can also be done in handover situations. In non-optimal transmissions, too, the transmission and acknowledgement of data packets can be continued, even though some data packets disappeared from the transmission. Another advantage is that the lost data packets can be defined unambiguously. A further advantage is that the data packet numbering of the invention can also be utilized in a handover between the UMTS and the GPRS. Further, the invention can be used in the handover between the UMTS radio network subsystems (SRNS Relocation).

BRIEF DESCRIPTION OF THE DRAWINGS

In the following the invention will be described in greater detail in connection with the preferred embodiments, with reference to the attached drawings, in which.

DETAILED DESCRIPTION OF THE INVENTION

The invention will now be described by way of example in connection with a packet radio service according to the UMTS and GPRS systems. However, the invention is not restricted only to these systems, but it can be applied to any packet-switched data transmission method, which requires data packet acknowledgement in a manner described later. The invention can particularly be applied to a reliable handover between the UMTS and the GPRS and a handover between the UMTS radio network subsystems (SRNS Relocation). Thus, the term receiving PDCP used in this description can be replaced with the corresponding GPRS function SNDCP in the above-mentioned case.

Figure 1:
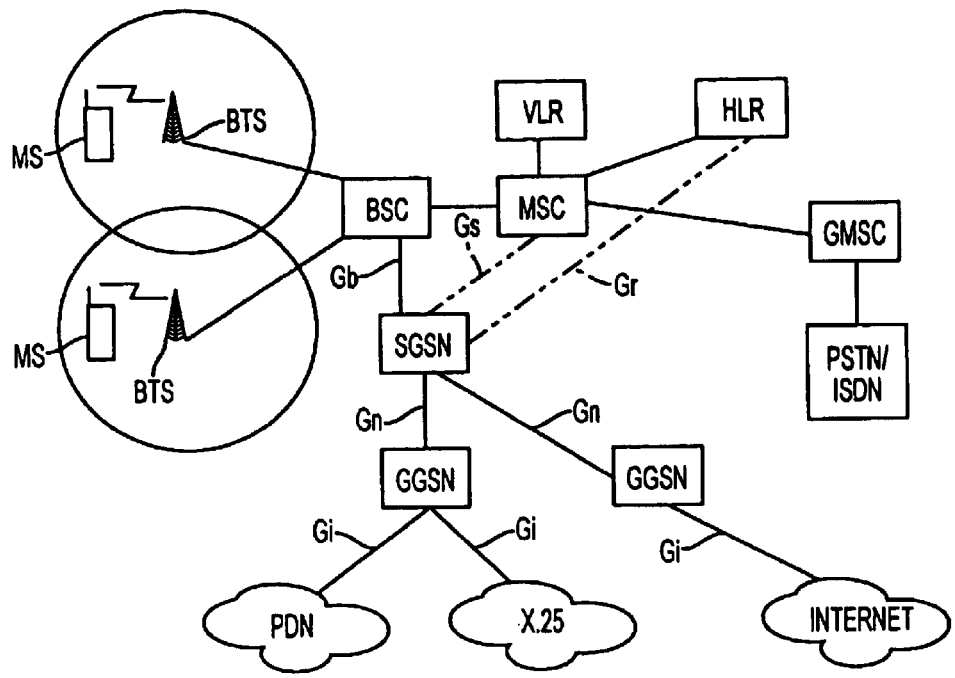
FIG. 1 shows a block diagram of the structure of the GSM/GPRS system.

FIG. 1 illustrates how a GPRS system is built on the basis of the GSM system. The GSM system comprises mobile stations MS, which communicate with base transceiver stations BTS over the radio path. A base station controller BSC is connected with several base transceiver stations BTS, which use radio frequencies and channels controlled by the base station controller BSC. The base station controllers BSC are connected via an interface A to a mobile services switching center MSC, which is responsible for connection establishment and for routing calls to right addresses. Two databases comprising information on mobile subscribers are used as help: a home location register HLR with information on all subscribers of the mobile communication network and the services they have subscribed to and a visitor location register VLR with information on mobile stations visiting the area of a certain mobile services switching center MSC. The mobile services switching center MSC is in connection with other mobile services switching centers via a gateway mobile services switching center GMSC and with a fixed telephone network PSTN (Public Switched Telephone Network). A more accurate description of the GSM system can be found in the ETSI/GSM specifications and the work *The GSM system for Mobile Communications*, M. Mouly and M. Pautet, Palaiseau, France, 1992, ISBN:2-957190-07-7.

The GPRS system connected to the GSM network comprises two, almost independent functions: a gateway GPRS support node GGSN and a serving GPRS support node The GPRS network may comprise several gateway nodes and serving nodes, and typically several serving nodes SGSN are connected to one gateway node GGSN. Both nodes SGSN and GGSN function as routers which support the mobility of the mobile station, control the mobile communication system and route data packets to mobile stations regardless of their location and the protocol used. The serving node SGSN communicates with the mobile station MS via the mobile communication network. The connection to the mobile communication network (interface Gb) is typically established either via the base transceiver station BTS or the base station controller BSC. The function of the serving node SGSN is to detect the mobile stations in its service area which are capable of GPRS connections, send data packets to and receive data packets from these mobile stations and monitor the location of the mobile stations in its service area. In addition, the serving node SGSN communicates with the mobile services switching center MSC and the visitor location register VLR via a signaling interface Gs and with the home location register HLR via an interface Gr. There are also GPRS records which contain the contents of subscriber-specific packet data protocols stored in the home location register HLR.

The gateway node GGSN functions as a gateway between the GPRS network and an external data network PDN (Packet Data Network). The external data network may be e.g. the GPRS network of another network operator, the Internet, an X.25 network or a private local area network. The gateway node GGSN communicates with these data networks via an interface Gi. The data packets to be transferred between the gateway node GGSN and the serving node SGSN are always encapsulated according to the GPRS standard. The gateway node SGSN also contains the PDP addresses (Packet Data Protocol) and routing data, i.e. the SGSN addresses of the GPRS mobile stations. The routing data are used for linking data packets between the external network and the serving node SGSN. The GPRS backbone network between the gateway node GGSN and the serving node SGSN is a network utilizing an IP protocol, preferably IPv6 (Internet Protocol, version 6).

Figure 2:
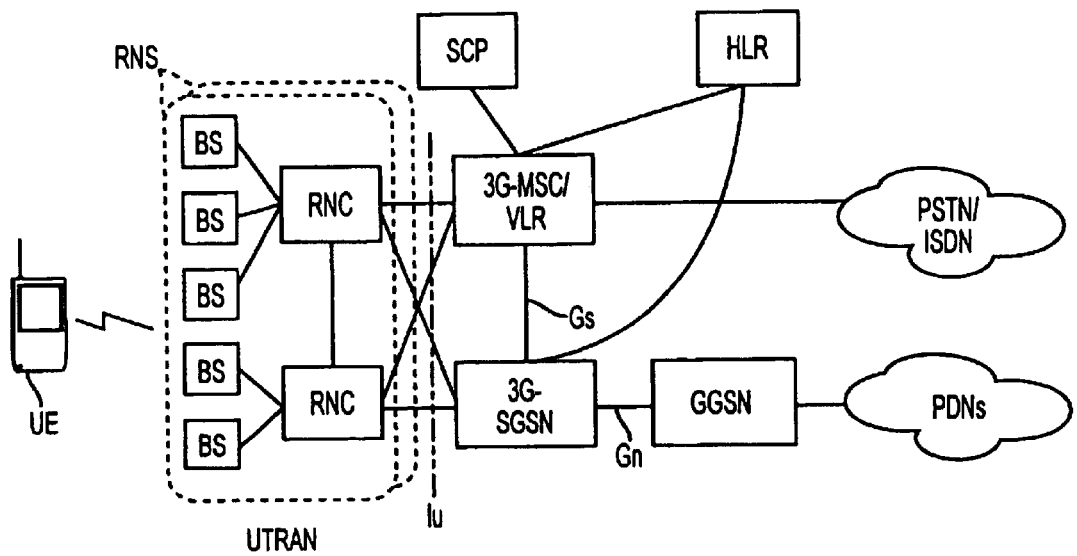
FIG. 2 shows a block diagram of the structure of the UMTS system.

In packet-switched data transmission, the term context is generally used for the connection between a terminal and a network address, which connection is provided by a telecommunication network. The term refers to a logical link between target addresses, through which link data packets are transmitted between the target addresses. This logical link can exist, even though no packets were transmitted, and thus it does not deprive the other connections of the system capacity either. In this respect the context differs from a circuit-switched connection, for example. FIG. 2 is a simplification of how a third generation UMTS network can be built in connection with a further developed GSM core network. In the core network, the mobile services switching center/visitor location register 3G-MSC/VLR communicates with the home location register HLR and preferably also with a service control point SCP of an intelligent network. A connection to the serving node 3G-SGSN is established via an interface Gs' and to the fixed telephone network PSTN/ISDN as described above in connection with the GSM. A connection from the serving node 3G-SGSN to the external data networks PDN is established in the entirely corresponding way as in the GPRS system, i.e. via an interface Gn to the gateway node GGSN, from which there is a further connection to the external data networks PDN. The connections of the mobile services switching center 3G-MSC/VLR and the serving node 3G-SGSN to the radio network UTRAN (UMTS Terrestrial Radio Access Network) are established via the interface Iu, which, compared with the GSM/GPRS system, combines the functionality of the interfaces A and Gb, in addition to which also entirely new functionality can be created for the interface Iu. The radio network UTRAN comprises several radio network subsystems RNS, which further comprise radio network controllers RNC and base stations BS, for which also the term Node B is used, in connection with them. The base stations are in radio connection with user equipment UE, typically mobile stations MS.

Figure 3A:
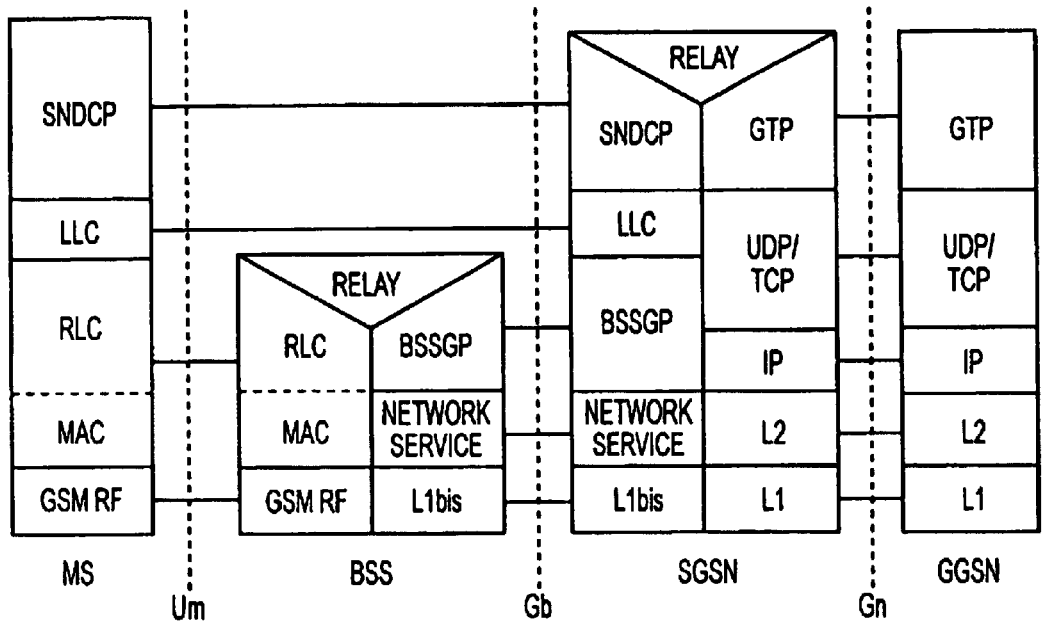
FIGS. 3a and 3b show protocol stacks of the GPRS and the UMTS.
Figure 3B:
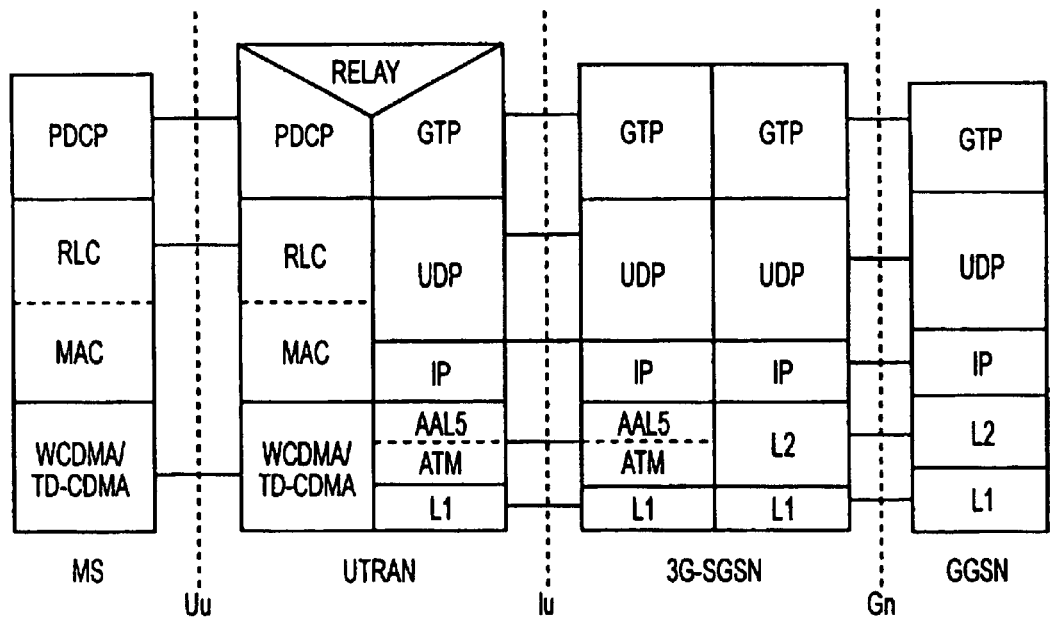

FIGS. 3a and 3b show protocol stacks of the GPRS and the UMTS respectively, and the specifications according to them are used for user data transmission in these systems. FIG. 3a illustrates a protocol stack used in the GPRS system for user data transmission between the mobile station MS and the gateway node GGSN. The data transmission between the mobile station MS and the base station system of the GSM network over the radio interface Um is performed according to the conventional GSM protocol. On the interface Gb between the base station system BSS and the serving node SGSN, the lowest protocol layer has been left open, and either the ATM protocol or the Frame Relay protocol is used in the second layer. The BSSGP layer (Base Station System GPRS Protocol) above it associates the data packets to be transmitted with specifications relating to routing and quality of service and signaling relating to data packet acknowledgement and Gb interface management.

Direct communication between the mobile station MS and the serving node SGSN is defined in two protocol layers, SNDCP (Sub-Network Dependent Convergence Protocol) and LLC (Logical Link Layer). User data transmitted in the SNDCP layer are segmented to one or more SNDC data units, whereby the user data and a TCP/IP header field or a UDP/IP header field associated with it can optionally be compressed. The SNDC data units are transmitted in LLC frames, with which address and checking information essential to the data transmission is associated, and in which frames the SNDC data units can be encrypted. The function of the LLC layer is to maintain the data transmission connection between the mobile station MS and the serving node SGSN and to retransmit the damaged frames. The serving node SGSN is responsible for routing data packets coming from the mobile station MS further to the right gateway node GGSN. A tunneling protocol (GTP, GPRS Tunneling Protocol) is used in this connection, encapsulating and tunneling all user data and signaling that are transmitted through the GPRS core network. The GTP protocol is run above the IP used by the GPRS core network.

A protocol stack of FIG. 3b used in the UMTS packet-switched user data transmission is very much equal to the protocol stack of the GPRS, yet with some substantial differences. As it can be seen from FIG. 3b, in the UMTS the serving node 3G-SGSN does no longer establish a direct connection on any protocol layer to the user equipment UE, such as the mobile station MS, but all data are transmitted through the radio network UTRAN. The serving node 3G-SGSN functions chiefly as a router, which transmits the data packets according to the GTP protocol to the radio network UTRAN. On the interface Uu between the radio network UTRAN and the user equipment UE, lower level data transmission on the physical layer is performed according to the WCDMA protocol or the TD-CDMA protocol. The functions of the RLC and MAC layers above the physical layer are very much similar to those of the corresponding layers of the GSM, yet in such a manner that functionalities of the LLC layer are delegated to the RLC layer of the UMTS. In respect to the GPRS system, the PDCP layer above them mainly replaces the SNDCP layer and the functionalities of the PDCP layer are very much similar to the functionalities of the SNDCP layer.

Figure 4:
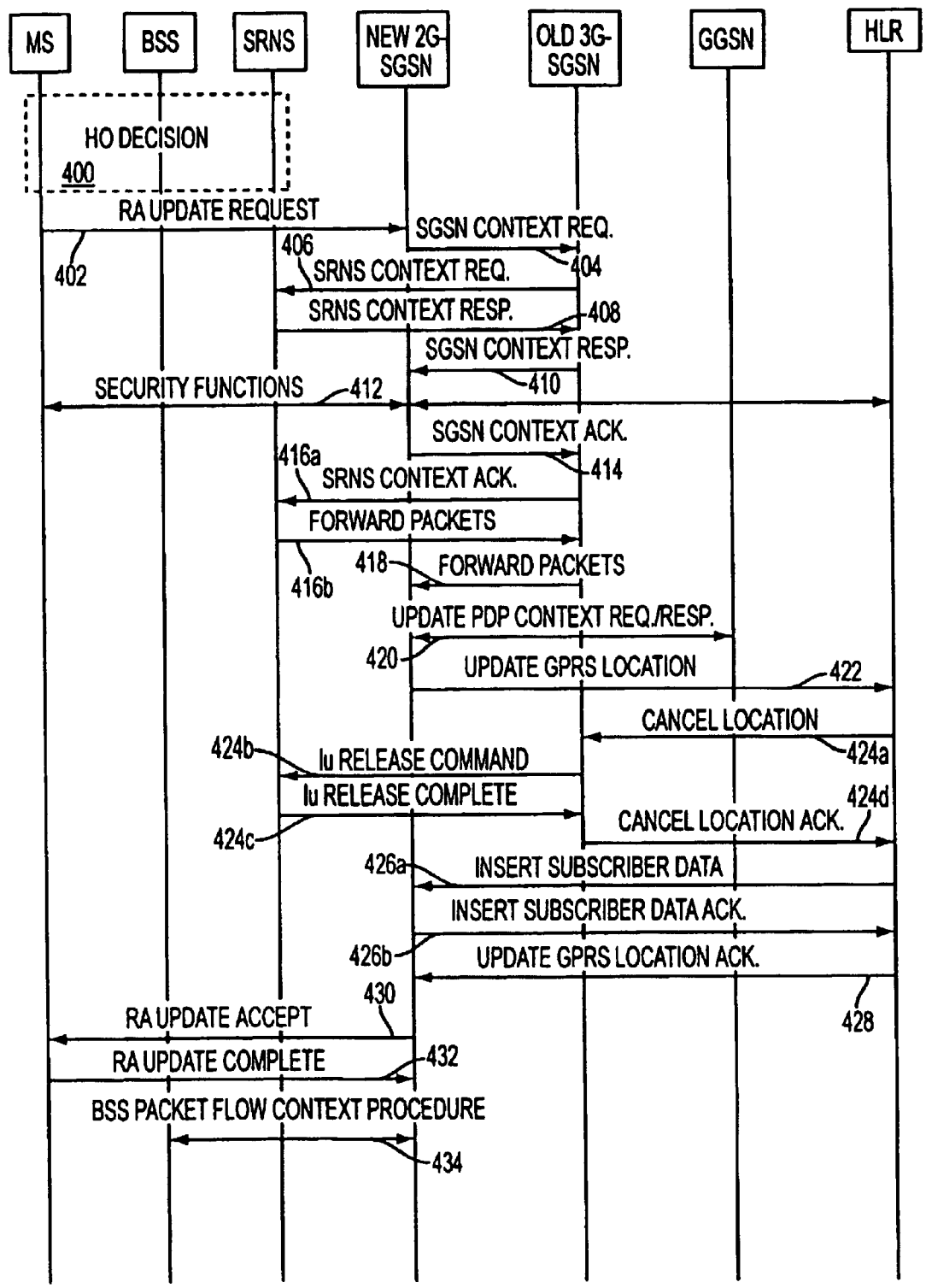
FIG. 4 shows a signaling diagram of a prior art handover process from the UMTS to the GPRS.

The signaling diagram of FIG. 4 illustrates a prior art handover from the UMTS to the GPRS. Such a handover takes place, when the mobile station MS moves during a packet data transmission from the UMTS cell to the GSM/GPRS cell, which uses a different serving node SGSN. The mobile station MS and/or the radio networks BSS/UTRAN decide to perform a handover (step 400). The mobile station transmits the new serving node 2G-SGSN a request for updating the routing area (RA Update Request, 402). The serving node 2G-SGSN transmits the old serving node 3G-SGSN a serving node context request defining the mobility management and the PDP context of the mobile station (SGSN Context Request, 404). The serving node 3G-SGSN transmits the radio network subsystem SRNS (Serving RNS), which was responsible for the packet data connection, an SRNS context request (406), in response to which the SRNS stops transmitting data packets to the mobile station MS, places the data packets to be transmitted to the buffer and transmits a response (SRNS Context Response, 408) to the serving node 3G-SGSN. In this connection, the radio network subsystem SRNS determines 8-bit PDCP-PDU numbers, or N-PDU numbers, for the data packets to be placed to the buffer. Having received the information on the mobility management and the PDP context of the mobile station MS, the serving node 3G-SGSN reports it to the serving node 2G-SGSN (SGSN Context Response, 410).

If necessary, the serving node 2G-SGSN may authenticate the mobile station from the home location register HLR (Security Functions, 412). The new serving node 2G-SGSN informs the old serving node 3G-SGSN of preparing to receive data packets of the activated PDP contexts (SGSN Context Ack, 414), in response to which the serving node 3G-SGSN requests the radio network subsystem SRNS (SRNS Context Ack, 416a) to transmit the data packets in the buffer to the serving node 3G-SGSN (Forward Packets, 416b), which forwards them to the serving node 2G-SGSN (Forward Packets, 418). The serving node 2G-SGSN and the gateway node GGSN update the PDP context according to the GPRS system (Update PDP Context Request/Response, 420). Thereafter, the serving node 2G-SGSN informs the home location register HLR of the new operating node (Update GPRS Location, 422), and the connection between the old serving node 3G-SGSN and the radio network subsystem SRNS is disconnected (424a, 424b, 424c, 424d), the required subscriber data are transmitted to the new serving node 2G-SGSN (426a, 426b) and the home location register HLR acknowledges the new serving node 2G-SGSN (Update GPRS Location Ack, 428).

After this, the serving node 2G-SGSN checks the subscriber rights of the mobile station MS and the location of the mobile station MS on its area and creates a logical link between the serving node 2G-SGSN and the mobile station MS, after which the request for updating the routing area required by the mobile station MS can be accepted (RA Update Accept, 430). In this connection, the information on the successful reception of the data packets is transmitted to the mobile station MS, the data packets having been transmitted by the mobile station MS to the radio network subsystem SRNS of the UMTS system before the handover process was started. Said data packets are identified on the basis of the PDCP-PDU numbers formed as described above. The mobile station MS acknowledges the acceptance of the request for updating the routing area (RA Update Complete, 432), whereby the information is transmitted to the serving node 2G-SGSN that the mobile station MS has successfully received the data packets, which the serving node 3G-SGSN has transmitted through the radio network subsystem SRNS before the handover process was started. The mobile station MS identifies the data packets with the 8-bit N-PDU numbers. Thereafter, the new serving node 2G-SGSN may start transmitting data packets through the base station system (434).

The formation of 8-bit PDCP-PDU numbers from 12-bit RLC sequence numbers and the resulting problems are illustrated in the following table.

| Bit No. | 12 | 11 | 10 | 9 | 8 | 7 | 6 | 5 | 4 | 3 | 2 | 1 |
|---|---|---|---|---|---|---|---|---|---|---|---|---|
| 94  | 0 | 0 | 0 | 0 | 0 | 1 | 0 | 1 | 1 | 1 | 1 | 0 |
| 350 | 0 | 0 | 0 | 1 | 0 | 1 | 0 | 1 | 1 | 1 | 1 | 0 |
| 606 | 0 | 0 | 1 | 0 | 0 | 1 | 0 | 1 | 1 | 1 | 1 | 0 |
| 862 | 0 | 0 | 1 | 1 | 0 | 1 | 0 | 1 | 1 | 1 | 1 | 0 |

The table shows by way of example, how decimal numbers 94, 350, 606 and 862 represented as 12 bits are converted to be represented as 8 bits in the above manner. As only 8 least significant bits are taken into account in the conversion, all said numbers have the same 8-bit binary representation. Thus, if the buffer contains almost 900 data units RLC-PDU, the data units having the above-mentioned RLC sequence numbers are represented similarly in 8 bits. When the recipient acknowledges the successfully received data packets to the transmitter, the transmitter cannot conclude on the basis of the acknowledged 8-bit numbers unambiguously, which data packet can be deleted from the buffer.

Figure 5:
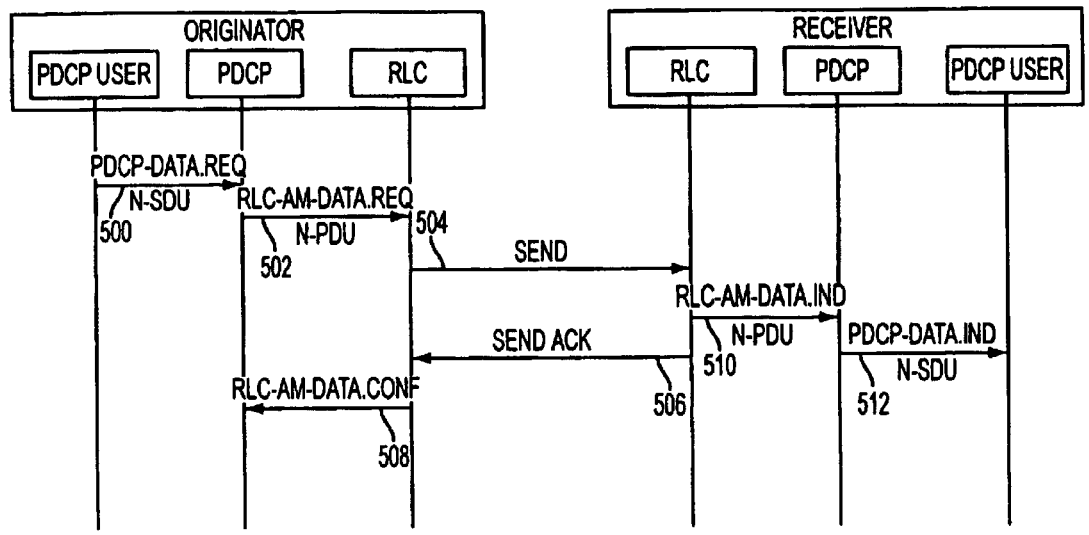
FIG. 5 shows a signaling diagram of reliable data transmission and data packet acknowledgement in a PDCP data transmission.

FIG. 5 illustrates how data transmission is acknowledged and how data packets propagate, when the acknowledged transmission is being used in the PDCP data transmission. A PDCP entity receives from the user a request (PDCP-DATA.request, 500) for transmitting data packets, and in connection with this request data packets PDCP-SDU (Service Data Unit) are also received, which are also called N-SDU, since they are data packets of the network layer. The PDCP entity compresses the header field of the data packets and transmits the data packets PDCP-PDU formed this way and the identification data of the radio link to the RLC layer (RLC-AM-DATA.request, 502) along with. The RLC layer is responsible for the transmission of the data packets PDCP-PDU (send, 504) and for the acknowledgement of a successful transmission (send ack, 506). In the PDCP entity the data packets N-SDU are placed to the buffer, from which they are not deleted until the acknowledgement is received from the RLC layer (RLC-AM-DATA.conf, 508) that the data packets have been successfully transferred to the recipient. The receiving PDCP receives the transmitted PDCP-PDUs from the RLC layer (RLC-AM-DATA.indication, 510), and the PDCP entity decompresses the data packets PDCP-PDU. This way, the original data packets N-SDU can be returned and they can further be transferred to the user (PDCP-DATA.indication, 512).

Figure 6:
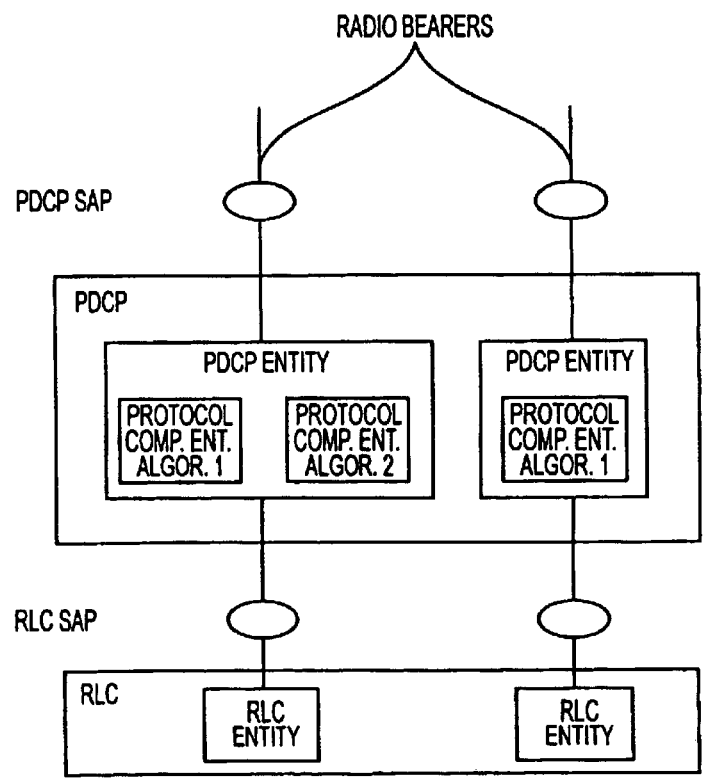
FIG. 6 shows a block diagram of a functional model of a PDCP layer.

FIG. 6 shows a functional model of a PDCP layer, in which one PDCP entity is defined for each bearer connection. As in current systems a specific PDP context is defined for each bearer connection, one PDCP entity is also defined for each PDP context, and for each PDCP entity, a specific RLC entity is defined in the RLC layer. In the GPRS system, the N-PDU numbering is based on the PDP context, wherefore the same principle is also suggested to be used in the UMTS, whereby the PDCP layer would number the data packets correspondingly on the basis of the PDCP entity. By using a similar numbering both in the GPRS and the UMTS, there should not arise any problems in the handover between the systems. However, associating one additional byte with each PDCP data packet consumes transmission capacity of the UMTS, especially because this additional byte is only needed in the handover between the UMTS and the GPRS and in the handover between the UMTS radio network subsystems.

The PDCP layer can further be implemented functionally such that several PDP contexts are multiplexed in the PDCP layer, whereby in the RLC layer below the PDCP layer one RLC entity receives data packets from several bearer connections simultaneously. Thus, the data packet numbers that are defined on the basis of the PDCP entity get mixed in the RLC layer and it is difficult to distinguish data packets coming from several bearer connections from one another, especially if the data packet numbering is based on the RLC sequence numbering.

The reliable data transmission using the acknowledged transmission requires a lossless handover, in which data packets are not lost in the handover process. Thus, in the UMTS system the RLC layer should fulfil certain requirements: the RLC layer should be in the acknowledged mode and the RLC should be capable of transmitting data packets in their right order without losing data packets or it should at least be capable of indicating the disappearance to the recipient. If these conditions are fulfilled, a reliable handover from the UMTS to the GPRS can be performed in accordance with the preferred embodiment of the invention without having to transmit the data packet numbers at all.

In accordance with the invention, a PDCP-PDU sequence number is determined for the first data packet of the packet data connection, and for this sequence number a predetermined numerical value, such as 0, is set as an initial value to the counter of the transmitting PDCP and the receiving PDCP/SNDCP of the connection. The invention can preferably be applied both in the reliable handover between the UMTS and the GPRS and in the handover between the UMTS radio network subsystems (STNS Relocation). Thus, the term receiving PDCP used in this description can be replaced with the corresponding function SNDCP of the GPRS in the first mentioned case.

Figure 7:
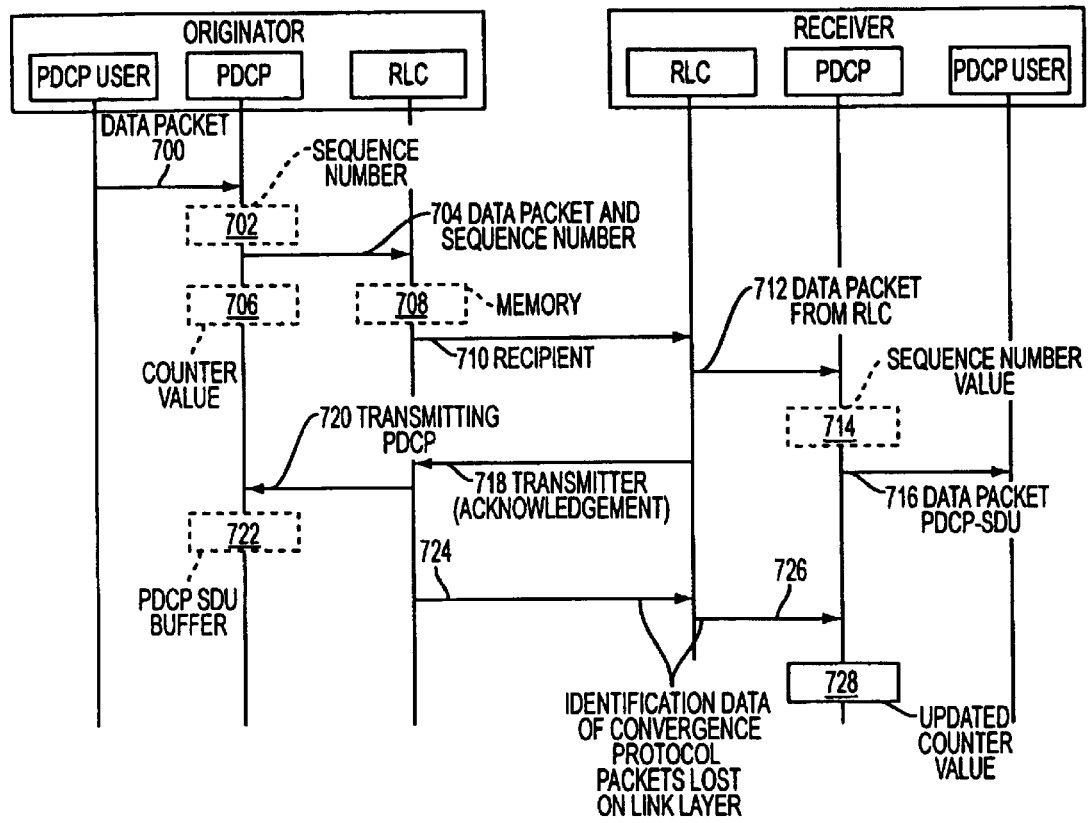
FIG. 7 shows a signaling diagram of reliable data transmission using data packet numbering according to the invention and data packet acknowledgement in a PDCP data transmission.

In the following, the procedure of the invention is illustrated by means of FIG. 7. As the transmitting PDCP receives (700) a data packet PDCP-SDU from the transmitter, it places the data packet PDCP-SDU to the buffer and associates the data packet logically with a PDCP-PDU sequence number (702). The transmitting PDCP transmits the data packet PDCP-PDU and the PDCP-PDU sequence number associated with it to the RLC layer (704) and increases the value of the counter indicating the PDCP-PCU sequence number value by one (706). The RLC layer may also optionally define the relation between the PDCP-PDU sequence number and the last RLC sequence number of the data packet and store it in the memory (708). The RLC layer transfers the data packets PDCP-PDU between the transmitter and the recipient (710), which data packets PDCP-PDU have been split into data units RLC-PDU for the transfer and numbered with RLC sequence numbers. When the receiving PDCP receives (712) the data packet PDCP-PDU coming from the RLC layer, it increases the value of the counter indicating the PDCP-PDU sequence number value of the received data packets by one (714) and transmits the data packet PDCP-SDU to the next layer (716). On the RLC layer, the acknowledgement of the successfully received data packet is transmitted to the transmitter (718), which acknowledgement the transmitting RLC transfers to the transmitting PDCP (720). In response to the acknowledgement, the transmitting PDCP deletes the data packet in question from the PDCP SDU buffer (722). The right data packet PDCP-SDU to be deleted is defined preferably by means of the PDCP-PDU sequence number logically associated with the data packet.

According to the invention, data packets are thus numbered preferably "virtually" such that the data packets are not associated with separate data packet numbers, but the transferred data packets are updated by means of the counters, and the receiving PDCP and the transmitting PDCP can verify the successful transfer of the data packets on the basis of the counter values. In the optimal case, the data packet acknowledgement according to the invention corresponds also in the handover process to the data packet acknowledgement in the normal PDCP data transmission described above. The handover process itself can be performed in accordance with the prior art, for example in the manner described in FIG. 4. It is to be noted that although the invention is illustrated above in connection with the handover process, the "virtual" data packet numbering of the invention can also be used in a normal reliable data transmission, in which the recipient and the transmitter are the same all the time, whereas in the handover process the other party changes.

However, the above "virtual" data packet numbering causes additional problems in some disturbance situations, e.g. when the network is heavily loaded or when there are disturbances on the radio transmission path, and particularly in the handover between the UMTS and the GPRS and the intra-UMTS handover, whereby the RLC layer cannot guarantee that data are transmitted reliably. A maximum value is typically defined for the transmitting RLC, either as the number of retransmissions or as a time period, during which the transmitting RLC tries to send the same data packet anew. If the maximum value is exceeded, the RLC layer (724) informs the receiving PDCP of this. The transmitting PDCP deletes the corresponding data packet from the buffer during the next successful data packet transmission. If the RLC layer can report all the lost data packets to the PDCP layer (726), the receiving PDCP can update (728) the PDCP-PDU sequence number right, and the sequence number counters of the transmitting PDCP and the receiving PDCP remain synchronized. However, in some of the above disturbance situations, the RLC layer cannot guarantee that the lost data packets on the RLC layer are reported to the PDCP layer, and the PDCP-PCU sequence number counters in the transmitting PDCP and the receiving PDCP may become unsynchronized.

A data packet discarding function is started on the RLC layer whenever the transmitting RLC detects that the maximum time or the number of retransmissions is exceeded, which causes that the data packet is discarded. The discarding function is associated with an MRW command (Move Receiving Window), which is transmitted to the receiving RLC and by which the receiving RLC is directed to move the receiving window such that the receiving RLC does no longer wait this data packet to be received. In the MRW command, the first RLC sequence number of that data packet is reported to the receiving RLC which is assumed to be the next data packet to be received. Thus, the receiving RLC is not aware of how many data packets have actually been discarded, and the data packet counters of the transmitter and the recipient cannot be synchronized.

Figure 8:
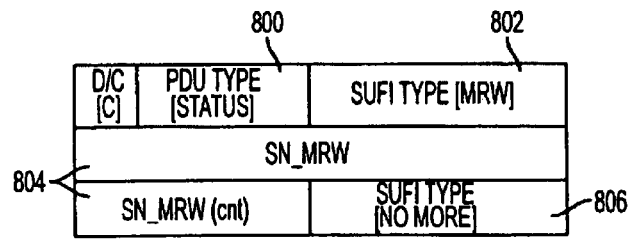
FIG. 8 shows a prior art indication message of data packet discarding.

FIG. 8 illustrates a prior art MRW command. The MRW command is transmitted in a data unit of a so-called status PDU type, i.e. a data unit by which the recipient is informed of the state of the system and controlled in the manner the state requires. According to FIG. 8, the types of a data unit (800) and a control command (802) are defined in the first byte. In the second and partly in the third byte, the first RLC sequence number (804) of that data packet is transmitted which is assumed to be the next data packet PDCP-PDU to be received. The third byte also comprises the end field of the control command (806). There is another version of this MRW command which slightly differs from what is described above. That version takes notice of the fact that one RLC-PDU may comprise information on several PDCP-PCU packets. The control functions of both known MRW commands, however, are substantially similar.

In accordance with the invention, the data packet discarding function on the RLC layer is improved such that the receiving RLC is made aware of all discarded data packets. The receiving RLC can thus transmit the information on the discarded data packets to the receiving PDCP, which preferably regulates the PDCP-PDU sequence number counter value to correspond to the transmitting PDCP counter value. The receiving RLC is made aware of all discarded data packets such that the transmitting RLC reports in the MRW command the number of the discarded data packets and also identifies the data unit RLC-PDU that is assumed to be received next in the above manner.

Figure 9A:
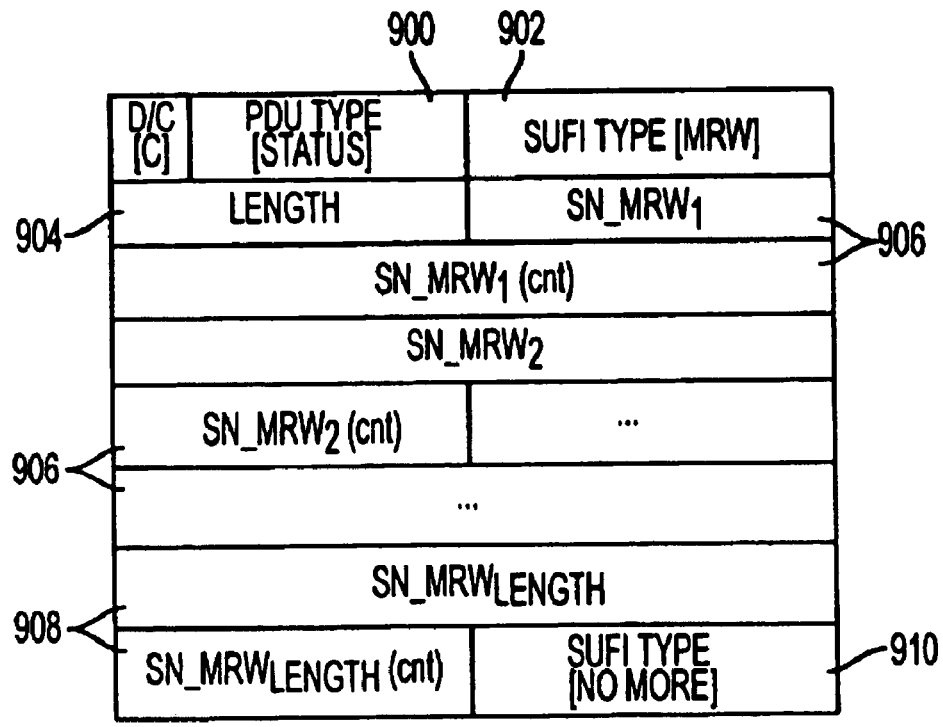
FIGS. 9a and 9b show indication messages of data packet discarding according to the invention.

According to a preferred embodiment of the invention, the receiving RLC is made aware of all discarded data packets by reporting each discarded data packet separately in the MRW command. This is shown in FIG. 9a illustrating the MRW command according to the preferred embodiment of the invention. The types of the data packet (900) and the control command (902) are defined according to the prior art MRW command in the first byte. The second byte comprises a field (904) for expressing the number of the discarded data packets, after which field each discarded data packet is identified. The identification can preferably be performed by associating the MRW command with a 12-bit, i.e. 1,5-byte, RLC sequence number associated with each discarded data packet (906). Finally, the RLC sequence number is identified (908), which is assumed to be the next data unit RLC-PDU to be received. The last byte also comprises the end field of the control command (910).

This way, the receiving RLC is capable of checking from the field indicating the number of the already discarded data packets (904), how many data packets have been discarded, which information is transferred to the receiving PDCP, which preferably regulates the PDCP-PDU sequence number counter value to correspond to the counter value of the transmitting PDCP. By identifying each data packet separately, the MRW command provides the advantage that each discarded data packet can, if required, be identified separately, e.g. when a new MRW command or the same MRW command as a retransmission arrives at the receiving RLC before the acknowledgement of the previous MRW command. In the above MRW command, the lost data packet can naturally be identified by associating the MRW command with all RLC sequence numbers associated with the data packet in question.

Figure 9B:
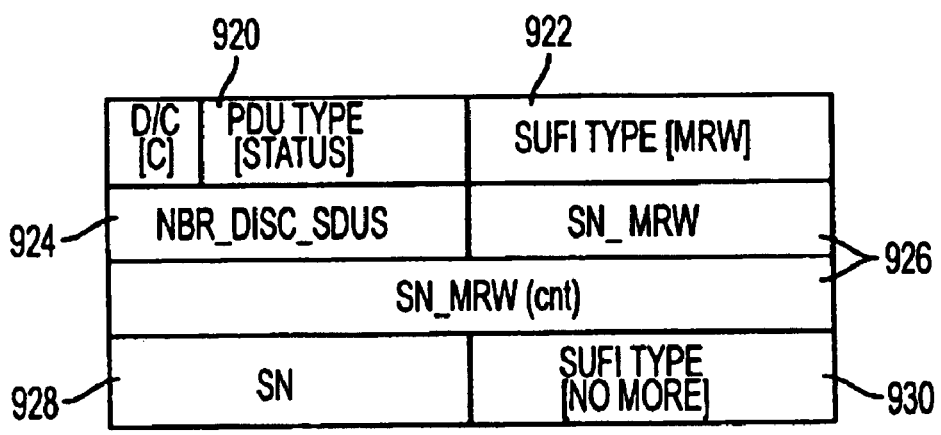

As an alternative to what is said above, the receiving RLC is made aware of all discarded data packets in accordance with the second embodiment of the invention by reporting only the number of the discarded data packets in the MRW command. This is shown in FIG. 9b illustrating the MRW command according to the second embodiment of the invention. The types of the data packet (920) and the control command (922) are defined according to the prior art MRW command in the first byte. The second byte comprises a field (924) for expressing the number of the discarded data packets, after which the RLC sequence number of the data unit, which is assumed to be received next, is identified (926). In addition, an individual sequence number is defined for each MRW command (928). The last byte contains the end field of the control command (930).

In this embodiment of the invention, the MRW command is preferably kept short, as each data packet is not identified separately. On the other hand, the length of the MRW command in the first embodiment seldom increases considerably either, since the situation in which there are more than one discarded data packets at a time, is extremely rare. The sequential numbering of the MRW commands prevents those problems that could appear when a new MRW command or the same MRW command as a retransmission arrives at the receiving RLC before the acknowledgement of the previous MRW command.

It is obvious for a person skilled in the art that as the technology develops, the basic idea of the invention can be implemented in a variety of ways. Thus, the invention and the embodiments thereof are not restricted only to the above examples, but may be modified in the scope of the claims.

What is claimed is:

1. A data packet transmission method in a packet-switched telecommunication system with a telecommunication protocol comprising a convergence protocol layer for adapting user data packets to convergence protocol packets and a link layer for transmitting the convergence protocol packets as data units and for acknowledging the transmission, the method comprising the steps of:
defining by means of a counter a data packet number for the convergence protocol packets to be transmitted;
transferring the convergence protocol packets to be transmitted to the link layer to be transmitted;
defining a data packet number for received convergence protocol packets by means of a counter;
acknowledging the received convergence protocol packets to a transmitter;
transmitting an identification data of convergence protocol packets lost on the link layer to a recipient in response to the link layer being not capable of securing a reliable transmission of the convergence protocol packets; and
updating a counter value of the recipient to correspond to a counter value of the transmitter such that the lost convergence protocol packets are taken into account in the counter value.

2. A method as claimed in claim 1, further comprising:
identifying the convergence protocol packets lost on the link layer to the recipient by defining a number of the lost convergence protocol packets and a data unit sequence number of the link layer that is assumed to be received next.

3. A method as claimed in claim 2, further comprising the step of:
identifying each lost convergence protocol packet to the recipient by defining a link layer sequence number associated with each lost convergence protocol packet.

4. A method as claimed in claim 3, further comprising the step of:
identifying each link layer sequence number associated with the lost convergence protocol packet.

5. A method as claimed in claim 1, further comprising the step of:
transmitting the identification data of the convergence protocol packets lost on the link layer to the recipient in a link layer data unit comprising a command to move a receiving window (MRW).

6. A method as claimed in claim 1, further comprising the step of acknowledging the transmission using a packet-switched mobile communication system, comprising a Universal Mobile Telecommunication System or a General Packet Radio Service system.

7. A method as claimed in claim 6, wherein method is applied to a handover between the Universal Mobile Telecommunication System and General Packet Radio Service.

8. A method as claimed in claim 6, wherein the method is applied to a handover between the Universal Mobile Telecommunication System radio network subsystems.

9. A packet-switched telecommunication system comprising:
a terminal;
a fixed network comprising a network element supporting a packet-switched data transmission in which telecommunication system data packets are arranged to be transmitted between the terminal and the network element; and wherein
a telecommunication protocol for the telecommunication system comprises:
a convergence protocol layer for adapting user data packets to convergence protocol packets; and
a link layer for transmitting the convergence protocol packets as data units and for acknowledging the transmission; and wherein
during a data packet transfer between the terminal and the network element:
a data packet number is arranged to be defined by means of a counter for the convergence protocol packets to be transmitted;
the convergence protocol packets to be transmitted are arranged to be transferred to the link layer to be transmitted;
a data packet number is arranged to be defined for the received convergence protocol packets by means of a counter;
the received convergence protocol packets are arranged to be acknowledged;
an identification data of lost convergence protocol packets is arranged to be transmitted on the link layer to a recipient in response to the link layer being not capable of securing a reliable transmission of the convergence protocol packets; and a counter value of the recipient is arranged to be updated to correspond to a counter value of a transmitter such that the lost convergence protocol packets are taken into account in the counter value of the recipient.

10. A telecommunication system as claimed in claim 9, wherein the lost convergence protocol packets are arranged to be identified on the link layer to the recipient by defining a number of the lost convergence protocol packets and a data unit sequence number of the link layer that is assumed to be received next.

11. A telecommunication system as claimed in claim 10, wherein each lost convergence protocol packet is arranged to be identified separately to the recipient by defining the link layer sequence number associated with each lost convergence protocol packet.

12. A telecommunication system as claimed in claim 11, wherein the link layer sequence number associated with each lost convergence protocol packet is arranged to be identified separately.

13. A telecommunication system as claimed in claim 9, wherein the identification data of lost convergence protocol packets is arranged to be transmitted on the link layer to the recipient in a link layer data unit comprising a command to move a receiving window (MRW).

14. A telecommunication system as claimed in claim 9, wherein the telecommunication system is a mobile communication system, including a Universal Mobile Telecommunication System or a General Packet Radio Service system, using a packet-switched telecommunication protocol.

15. A telecommunication system as claimed in claim 14, wherein the counter value of the recipient is arranged to be updated by means of the identification data of the lost convergence protocol packets in a handover between a Universal Mobile Telecommunication System and a General Packet Radio Service.

16. A telecommunication system as claimed in claim 14, wherein the counter value of the recipient is arranged to be updated by means of the identification data of the lost convergence protocol packets in the handover between a Universal Mobile Telecommunication System radio network subsystems.

17. A terminal for a packet-switched telecommunication system, the terminal being arranged to transmit data packets to a network element supporting a packet-switched data transmission, the terminal comprising:

means of a counter for defining a data packet number for convergence protocol packets to be transmitted between the terminal and a network element;

means for transferring the convergence protocol packets to be transmitted, to the link layer to be transmitted, means for receiving acknowledgements of the received convergence protocol packets from the network element; and means for transmitting only identmcation data of lost convergence protocol packets without the content of the packets on the link layer to network element in response to said acknowledgements indicating that the link layer is not capable of securing a reliable transmission of the convergence protocol packets.

18. A terminal as claimed in claim 17, further comprising: means for identifying the lost convergence protocol packets on the link layer to the network element by defining a number of the lost convergence protocol packets and a data unit sequence number of the link layer that is assumed to be received next.

19. A terminal as claimed in claim 18, further comprising: means for identifying each lost convergence protocol packet separately to the network element by defining a link layer sequence number associated with each lost convergence protocol packet.

20. A terminal as claimed in claim 19, further comprising: means for identifying the link layer sequence numbers associated with each lost convergence protocol packet, separately.

21. A terminal as claimed in claim 17, further comprising: means for transmitting the Identification data of the lost convergence protocol packets on the link layer to the network element in a link layer data unit comprising a command to move a receiving window.

22. A terminal for a packet-switched telecommunication system, the terminal being arranged to receive data packets from a network element supporting a packet-switched data transmission, the terminal comprising a link layer for receiving data units and for supplying the data units to a convergence protocol layer as convergence protocol packets for adaptation into user data packets;

means of a counter for defining a data packet number for received convergence protocol packets;

means for acknowledging the received convergence protocol packets;

means for receiving identification data of lost convergence protocol packets on the link layer in response to the link layer being not capable of securing a reliable transmission of the convergence protocol packets; and means for updating a counter value to correspond to a counter value of the network element by taking into account a number of the lost convergence protocol packets in the counter value.

23. A terminal according to claim 22, wherein the telecommunication system is a mobile communication system, including a UMTS or a GPRS system, using a packet-switched telecommunication protocol, the terminal further comprising:

means for updating the counter value of the terminal by means of the identification data of the lost convergence protocol packets in a handover between the UMTS and the GPRS.

24. A terminal according to claim 22, wherein the telecommunication system is a mobile communication system, using a packet-switched telecommunication protocol, the terminal further comprising:

means for updating the counter value of the terminal by means of the identification data of the lost convergence protocol packets in a handover between UMTS radio network subsystems.

25. A network element for a packet-switched telecommunication system, the network element being arranged to transmit data packets to a terminal supporting a packet-switched data transmission, the network element comprising:

means of a counter for defining a data packet number for convergence protocol packets to be transmitted between the network element and the terminal;

means for transferring the convergence protocol packets to be transmitted to a link layer to be transmitted;

means of a counter for defining a data packet number for received convergence protocol packets;

means for receiving acknowledgements of the received convergence protocol packets from the terminal; and means for transmitting only identification data of lost convergence protocol packets without the content of the packets on the link layer to the terminal in response to said acknowledgements indicating that the link layer is not capable of securing a reliable transmission of the convergence protocol packets.

26. A network element as claimed in claim 25, further comprising:

means for identifying the lost convergence protocol packets on the link layer to the terminal by defining a number of the lost convergence protocol packets and a data unit sequence number of the link layer that Is assumed to be received next.

27. A network element as claimed in claim 26, further comprising:

means for identifying each lost convergence protocol packet separately to the terminal by defining a link layer sequence number associated with each lost convergence protocol packet.

28. A network element as claimed in claim 27, further comprising:

means for identifying the link layer sequence numbers associated with each lost convergence protocol packet separately.

29. A network element as claimed in claim 25, further comprising:

means for transmitting the identification data of the lost convergence protocol packets on the link layer to the terminal in a link layer data unit comprising a command to move a receiving window.

30. A network element for a packet-switched telecommunication system, the network element being arranged to receive data packets from a terminal supporting a packet-switched data transmission, the network element comprising:

a link layer for receiving data units and for supplying the data units further to a convergence protocol layer as convergence protocol packets for adaptation into user data packets;

means of a counter for defining a data packet number for received convergence protocol packets;

means for acknowledging the received convergence protocol packets;

means for receiving identification data of lost convergence protocol packets on the link layer in response to the link layer being not capable of securing a reliable transmission of the convergence protocol packets; and means for updating a counter value to correspond to a counter value of the terminal by taking Into account a number of the lost convergence protocol packets in the counter value.

31. A network element according to claim 30, wherein the telecommunication system is a mobile communication system, including a UMTS or a GPRS system, using a packet-switched telecommunication protocol, the network element further comprising:

means for updating a counter value of the network element by means of the identification data of the lost convergence protocol packets in a handover between the UMTS and the GPRS.

32. A network element according to claim 30, wherein the telecommunication system is a mobile communication system, using a packet-switched telecommunication protocol, the network element further comprising:

means for updating a counter value of the network element by means of the identification data of the lost convergence protocol packets in a handover between UMTS radio network subsystems.

33. The terminal of claim 22 wherein the telecommunication system is a UMTS or a GPRS system.

34. The network element of claim 30 wherein the telecommunication system is a UTMS or a GPRS system.

* * * * *